(12) United States Patent
Takeuchi

(10) Patent No.: US 8,222,838 B2
(45) Date of Patent: Jul. 17, 2012

(54) LIGHT-EMITTING-ELEMENT DRIVING CIRCUIT

(75) Inventor: Takuya Takeuchi, Kakogawa (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 178 days.

(21) Appl. No.: 12/842,076

(22) Filed: Jul. 23, 2010

(65) Prior Publication Data

US 2011/0018452 A1    Jan. 27, 2011

(30) Foreign Application Priority Data

Jul. 23, 2009 (JP) ................................. 2009-171906

(51) Int. Cl.
*H05B 37/02* (2006.01)
*H05B 41/36* (2006.01)
(52) U.S. Cl. ......... 315/362; 315/192; 315/320; 315/294
(58) Field of Classification Search .............. 315/185 R, 315/192, 291, 294, 295, 312, 313, 320, 263
See application file for complete search history.

(56) References Cited

U.S. PATENT DOCUMENTS

| | | | |
|---|---|---|---|
| 7,420,335 B2 * | 9/2008 | Robinson et al. | 315/224 |
| 7,642,724 B2 | 1/2010 | Muto | |
| 2008/0048567 A1 * | 2/2008 | Steele et al. | 315/151 |
| 2009/0237004 A1 * | 9/2009 | Ploquin et al. | 315/294 |
| 2010/0060177 A1 * | 3/2010 | Takata et al. | 315/185 R |
| 2010/0328370 A1 * | 12/2010 | Takata et al. | 345/694 |
| 2011/0001434 A1 * | 1/2011 | Hsu et al. | 315/186 |
| 2011/0254468 A1 * | 10/2011 | Chen et al. | 315/307 |

FOREIGN PATENT DOCUMENTS

JP    2008-251886 A    10/2008

* cited by examiner

*Primary Examiner* — Don Le
(74) *Attorney, Agent, or Firm* — Cantor Colburn LLP

(57) ABSTRACT

There is provided a light-emitting-element driving circuit which comprises a light-emitting circuit unit in which a plurality of current paths in each of which a light-emitting element and a first switching element are connected in series are placed in parallel with each other between a power supply terminal connected to an input power supply and a common terminal, a common circuit unit in which a second switching element and a constant current source which supplies a predetermined current which is defined in advance are connected in series and which is placed between the common terminal and a ground terminal which is grounded, and a plurality of third switching elements each of which is placed between an anode terminal of the respective light-emitting element of the light-emitting circuit unit and ground, wherein a switching control is applied for the first switching elements, the second switching element, and the third switching elements.

4 Claims, 12 Drawing Sheets

LIGHT-EMITTING-ELEMENT DRIVING CIRCUIT

CROSS-REFERENCE TO RELATED APPLICATIONS

The entire disclosure of Japanese Patent Application No. 2009-171906 filed on Jul. 23, 2009, including the specification, claims, drawings, and abstract, is incorporated herein by reference in its entirety.

BACKGROUND

1. Technical Field

The present invention relates to a light-emitting-element driving circuit, and in particular to a light-emitting-element driving circuit which drives a plurality of light-emitting elements.

2. Background Art

In recent years, various electronic devices such as portable phones are equipped with a light-emitting-element driving circuit. For example, Patent Literature 1 (JP 2008-251886 A) discloses a structure comprising a drive current supply circuit which is connected between a first power supply and a second supply and in series with a light-emitting element, and supplies a drive current to the light-emitting element according to a voltage on a control terminal, and a current-determining circuit which determines and outputs a current according to an amount of output light of the light-emitting element. The structure further comprises a current-voltage converter circuit which converts a current determined by the current-determining circuit into a voltage and outputs the converted voltage to the control terminal of the drive current supply circuit when a control signal is in a first state, and which disconnects the output voltage terminal from the control terminal of the drive current supply circuit when the control signal is in a second state. The structure also comprises a reset circuit which connects the control terminal of the drive current supply circuit to the second power supply when the control signal is in the second state.

Among known light-emitting-element driving circuits, there exists a light-emitting-element driving circuit in which a plurality of light-emitting elements are arranged in a matrix form and are sequentially caused to emit light. As shown in FIGS. 3A-3D, in a plurality of light-emitting elements 16, 26, 36, and 46 placed in parallel with each other, switching elements for the light-emitting element 12, 22, 32, and 42 are sequentially switched, and, for example, in order to emit light from only the light-emitting element 16, a common switching element 8 is controlled to be switched ON during a first period in FIG. 3A.

More specifically, during the first period, as shown in FIG. 3A, the switching element for light-emitting element 12 and the common switching element 8 are controlled to be switched ON and the switching elements for light-emitting element 22, 32, and 42 are controlled to be switched OFF, so that only the light-emitting element 16 emits light. Then, during a second period, as shown in FIG. 3B, the common switching element 8 and the switching element for light-emitting element 12 are controlled to be switched OFF, the switching element for light-emitting element 22 adjacent to the switching element for light-emitting element 12 is controlled to be switched ON, and the switching elements for light-emitting element 32 and 42 are maintained in the OFF state.

Then, during a third period, as shown in FIG. 3C, the switching element for light-emitting element 22 is controlled to be switched OFF, the switching element for light-emitting element 32 adjacent to the switching element for light-emitting element 22 is controlled to be switched ON, and the common switching element 8 and the switching elements 12 and 42 for light-emitting element are maintained in the OFF state. Finally, during a fourth period, as shown in FIG. 3D, the switching element for light-emitting element 32 is controlled to be switched OFF, the switching element for light-emitting element 42 adjacent to the switching element for light-emitting element 32 is controlled to be switched ON, and the common switching element 8 and the switching elements for light-emitting element 12 and 22 are maintained in the OFF state. The control then returns to the switching control during the first period shown in FIG. 3A. In this manner, a switching control for switching the states of FIGS. 3A, 3B, 3C, and 3D in this order is repeated periodically.

As shown in FIGS. 3A-3D, parasitic capacitances 14, 24, 34, and 44 are formed at anode terminals of the light-emitting elements 16, 26, 36, and 46, and, when the switching elements for light-emitting element 22, 32, and 42 are controlled to be switched ON, charges are accumulated in the parasitic capacitances 24, 34, and 44. In the first period in which the light-emitting element 16 emits light, when the common switching element 8 is controlled to be switched ON as shown in FIG. 3A, the charges accumulated in the parasitic capacitances 24, 34, and 44 flow as leakage currents, and there is a possibility that light is emitted from the light-emitting elements 26, 36, and 46.

SUMMARY

According to one aspect of the present invention, there is provided a light-emitting-element driving circuit comprising a light-emitting circuit unit in which a plurality of current paths in each of which a light-emitting element and a first switching element are connected in series are placed in parallel with each other between a power supply terminal connected to an input power supply and a common terminal, a common circuit unit in which a second switching element and a constant current source which supplies a predetermined current which is defined in advance are connected in series, and which is placed between the common terminal and a ground terminal which is grounded, and a plurality of third switching elements each of which is placed between an anode terminal of the respective light-emitting element of the light-emitting circuit unit and ground, wherein a switching control is applied for the first switching elements, the second switching element, and the third switching elements.

BRIEF DESCRIPTION OF THE DRAWINGS

A preferred embodiment of the present invention will be described in further detail based on the following drawings, wherein.

DESCRIPTION OF EMBODIMENT

Figure 1A:
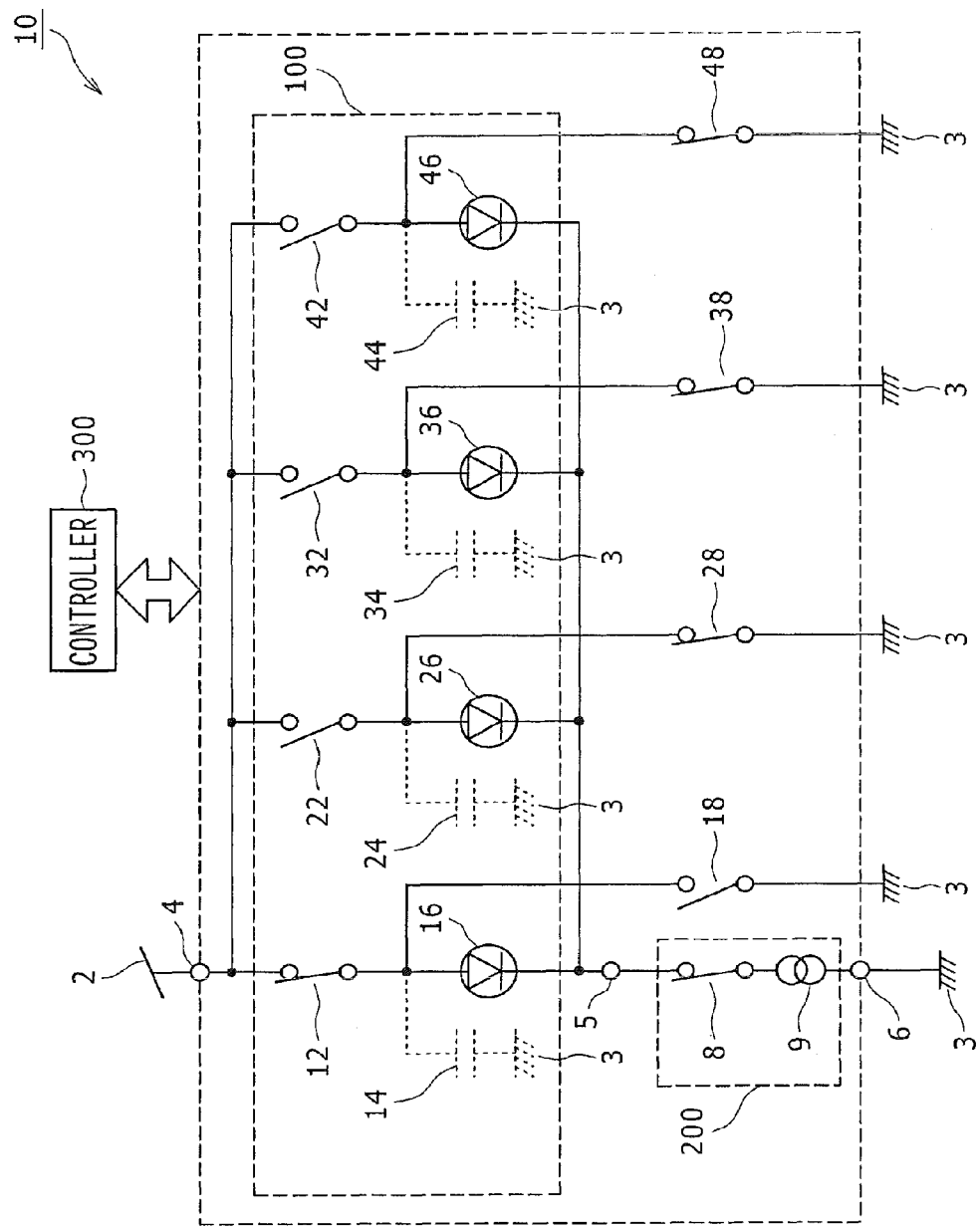
FIG. 1A is a diagram showing a switching control during a first period in a preferred embodiment of the present invention.

A preferred embodiment of the present invention will now be described with reference to the attached drawings. In the following description, similar elements in all drawings are assigned the same reference numerals and repeated descriptions will be repeatedly omitted. In the description, reference numerals which have already been described will be referred to as necessary. Although the switching element is described as being switched by a controller of the light-emitting-element driving circuit, the present invention is not limited to such a structure, and the switching element may be controlled by an external controlling unit.

FIG. 1 is a diagram showing a light-emitting-element driving circuit 10. The light-emitting-element driving circuit 10 comprises a light-emitting circuit unit 100, a common circuit unit 200, switching elements for discharging parasitic capacitance 18, 28, 38, and 48, and a controller 300.

The light-emitting circuit unit 100 is a circuit in which a plurality of current paths in each of which a light-emitting element and a switching element for light-emitting element are connected in series are placed in parallel with each other between a power supply terminal 4 connected to an input power supply 2 and a common terminal 5. More specifically, in the light-emitting circuit unit 100, a current path in which a light-emitting element 16 and a switching element for light-emitting element 12 are connected in series, a current path in which a light-emitting element 26 and a switching element for light-emitting element 22 are connected in series, a current path in which a light-emitting element 36 and a switching element for light-emitting element 32 are connected in series, and a current path in which a light-emitting element 46 and a switching element for light-emitting element 42 are connected in series are placed in parallel with each other between the power supply terminal 4 and the common terminal 5.

The light-emitting elements 16, 26, 36, and 46 are circuit elements which emit light when a voltage is applied in a forward direction between a cathode terminal (negative electrode) and an anode terminal (positive electrode). The light-emitting elements 16, 26, 36, and 46 have their respective anode terminals connected to second terminals of the switching elements for light-emitting element 12, 22, 32, and 42, respectively, and cathode terminals connected to the common terminal 5. Parasitic capacitances 14, 24, 34, and 44 are formed between the anode terminals of the light-emitting elements 16, 26, 36, and 46 and a ground 3, respectively.

The switching elements for light-emitting element 12, 22, 32, and 42 are switching elements controlled to be switched ON and OFF by the controller 300, and are constructed, for example, from transistors. The switching elements for light-emitting element 12, 22, 32, and 42 have first terminals connected to the power supply terminal 4 and the second terminals connected to the anode terminals of the light-emitting elements 16, 26, 36, and 46, respectively.

The common circuit unit 200 is a circuit placed between the common terminal 5 and a grounding terminal 6. The common switching element 8 is a switching element controlled to be switched ON and OFF by the controller 300, and is constructed, for example, from a transistor. The common switching element 8 has a first terminal connected to the common terminal 5 and a second terminal connected to a first terminal of a constant current source 9.

The constant current source 9 is a current source for driving the light-emitting elements 16, 26, 36, and 46 with a drive current which is defined in advance. The constant current source 9 has the first terminal connected to the second terminal of the common switching element 8, and a second terminal connected to the grounding terminal 6, which is connected to the ground 3 and grounded.

The switching element for discharging parasitic capacitance 18 is a switching element which is controlled to be switched ON and OFF by the controller 300, and is constructed, for example, from a transistor. The switching element for discharging parasitic capacitance 18 has a first terminal connected to the anode terminal of the light-emitting element 16, and a second terminal connected to the ground 3 and grounded.

The switching element for discharging parasitic capacitance 28 is a switching element which is controlled to be switched ON and OFF by the controller 300, and is constructed, for example, from a transistor. The switching element for discharging parasitic capacitance 28 has a first terminal connected to the anode terminal of the light-emitting element 26, and a second terminal connected to the ground 3 and grounded.

The switching element for discharging parasitic capacitance 38 is a switching element which is controlled to be switched ON and OFF by the controller 300, and is constructed, for example, from a transistor. The switching element for discharging parasitic capacitance 38 has a first terminal connected to the anode terminal of the light-emitting element 36, and a second terminal connected to the ground 3 and grounded.

The switching element for discharging parasitic capacitance 48 is a switching element which is controlled to be switched ON and OFF by the controller 300, and is constructed, for example, from a transistor. The switching element for discharging parasitic capacitance 48 has a first terminal connected to the anode terminal of the light-emitting element 46, and a second terminal connected to the ground 3 and grounded.

The controller 300 is a control circuit having a function to execute a switching control of the switching elements for light-emitting element 12, 22, 32, and 42, the common switching element 8, and the switching elements for discharging parasitic capacitance 18, 28, 38, and 48. With the switching control of the controller 300, a drive current flows in the light-emitting elements 16, 26, 36, and 46, so that light is sequentially emitted from the light-emitting elements 16, 26, 36, and 46.

Figure 1B:
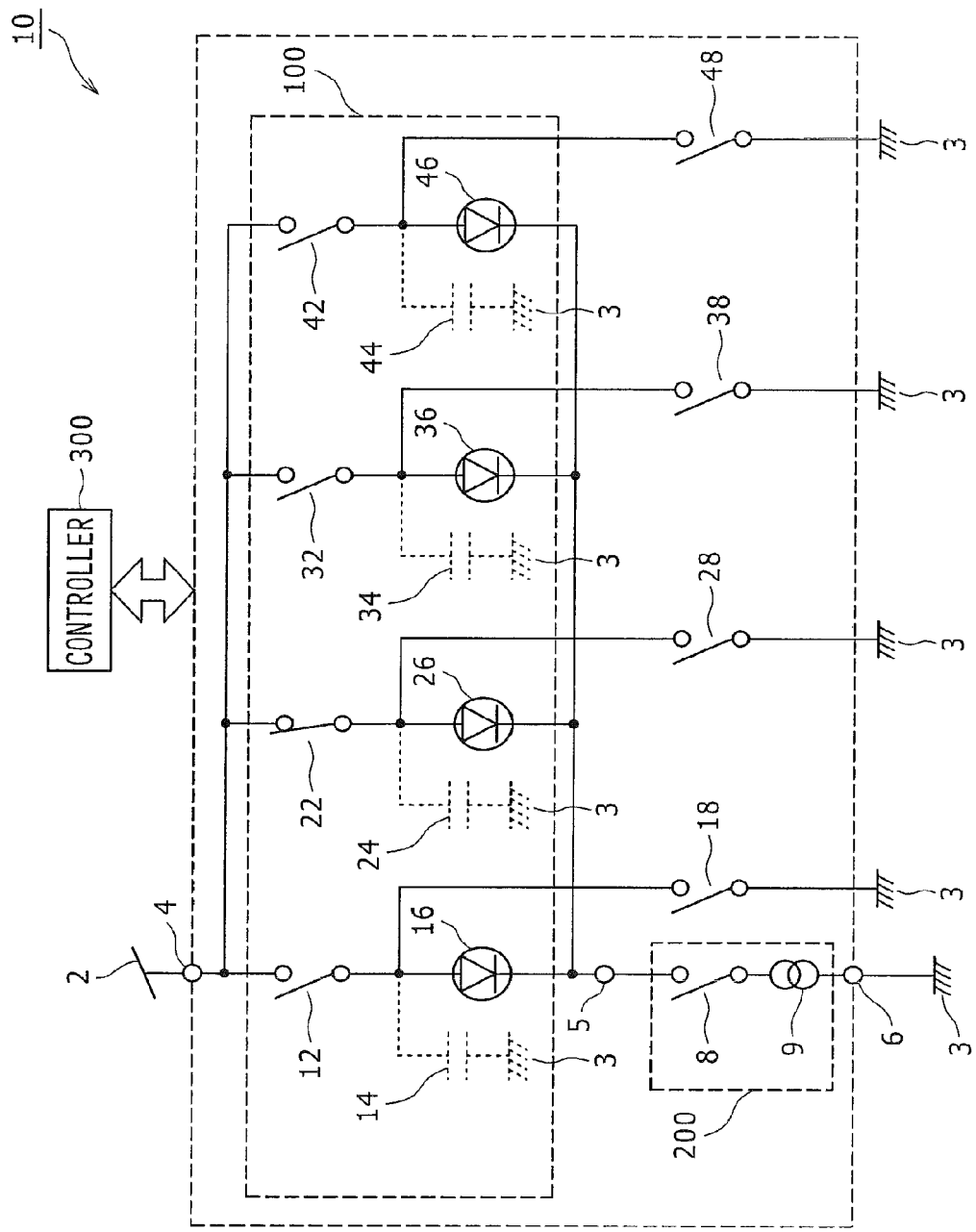
FIG. 1B is a diagram showing a switching control during a second period in the preferred embodiment of the present invention.

Next, an operation of the light-emitting element driving circuit 10 having the above-described structure will be described with reference to FIGS. 1A-1D. FIG. 1A is a diagram showing a switching control during a first period in the switching control of the controller 300. FIG. 1B is a diagram showing a switching control during a second period in the switching control of the controller 300. FIG. 10 is a diagram showing a switching control during a third period in the switching control of the controller 300. FIG. 1D is a diagram showing a switching control during a fourth period in the switching control of the controller 300. In FIGS. 1A-1D, in order to emit light from only the light-emitting element 16 at a certain timing, the switching elements for light-emitting element 12, 22, 32, and 42, etc. are sequentially switched, and a switching control is applied by repeating, with a certain period, the configurations of FIG. 1A, FIG. 1B, FIG. 10, FIG. 1D, FIG. 1A, FIG. 1B, . . . .

During the first period shown in FIG. 1A, in order to emit light from the light-emitting element 16, the switching element for light-emitting element 12 and the common switching element 8 are controlled to be switched ON, and the switching elements for discharging parasitic capacitance 28, 38, and 48 are controlled to be switched ON. In addition, the switching elements for light-emitting element 22, 32, and 42 and the switching element for discharging parasitic capacitance 18 are controlled to be switched OFF.

Because the switching element for light-emitting element 12 and the common switching element 8 are controlled to be switched ON, a drive current flows to the light-emitting element 16 and light is emitted. Because the switching elements for discharging parasitic capacitance 28, 38, and 48 are controlled to be switched ON, the anode terminals of the light-emitting elements 26, 36, and 46 are dropped to the ground level (ground), and, thus, even if charges have been accumulated in the parasitic capacitances 24, 34, and 44, the charges are discharged.

Next, during the second period shown in FIG. 1B, the switching element for light-emitting element 22 is controlled to be switched ON, and the switching elements for light-emitting element 12, 32, and 42, the common switching element 8, and the switching elements for discharging parasitic capacitance 18, 28, 38, and 48 are controlled to be switched OFF. Although charges may be accumulated in the parasitic capacitance 24 in this process, the charges accumulated during this period are discharged when the above-described switching control during the first period shown in FIG. 1A is again executed.

Figure 1C:
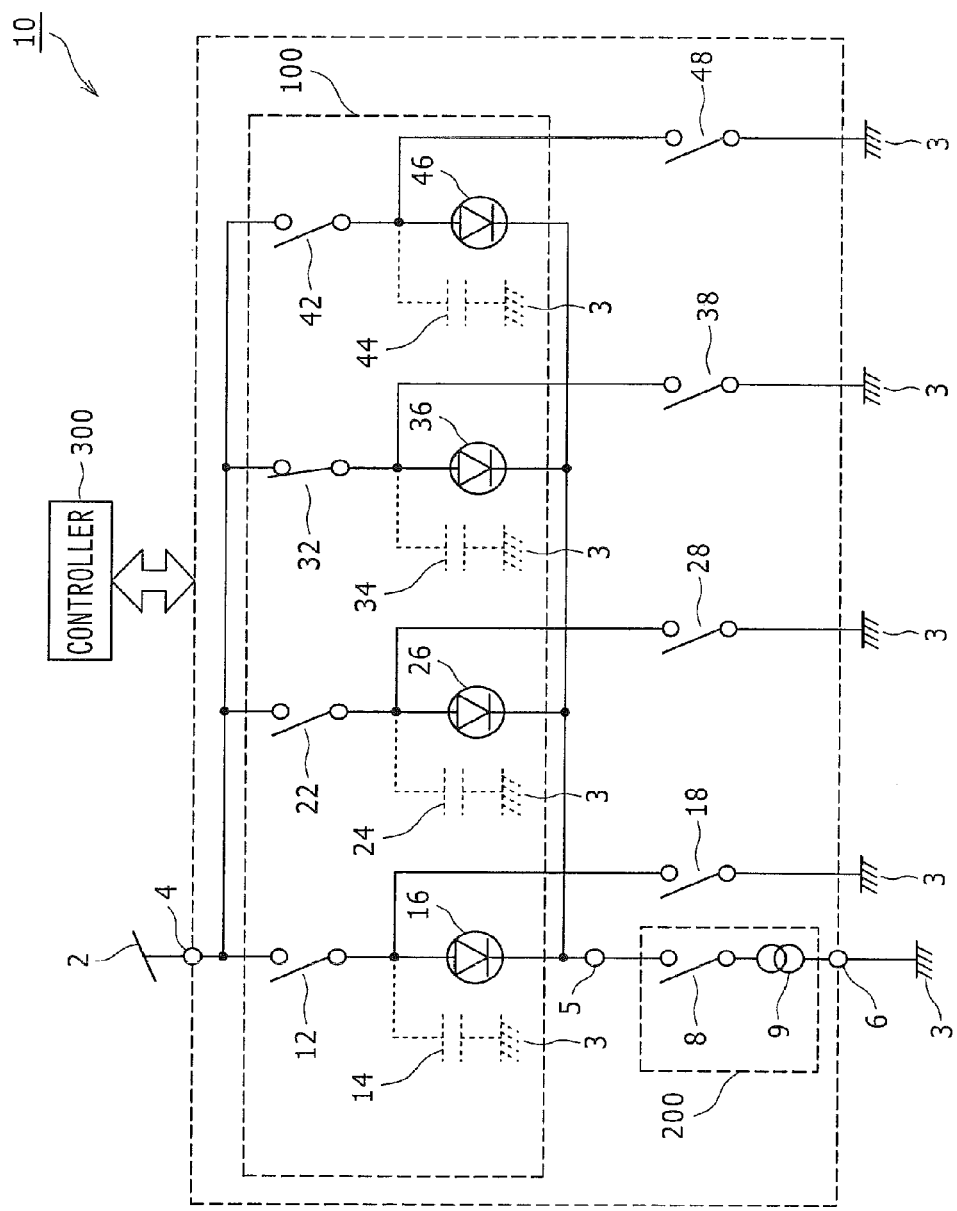
FIG. 1C is a diagram showing a switching control during a third period in the preferred embodiment of the present invention.
Figure 1D:
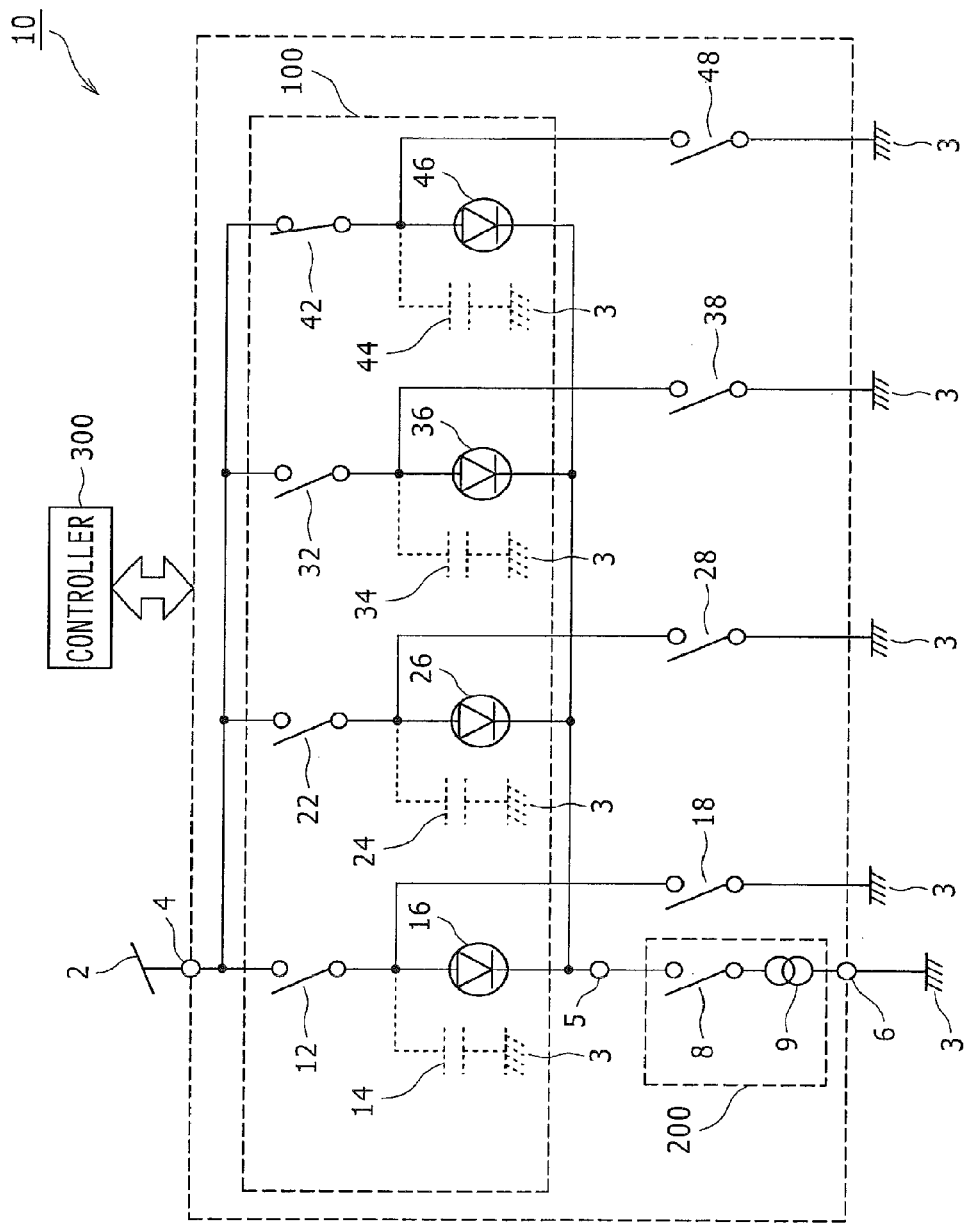
FIG. 1D is a diagram showing a switching control during a fourth period in the preferred embodiment of the present invention.

Next, during the third period shown in FIG. 1C, the switching element for light-emitting element 32 is controlled to be switched ON, and the switching elements for light-emitting element 12, 22, and 42, the common switching element 8, and the switching elements for discharging parasitic capacitance 18, 28, 38, and 48 are controlled to be switched OFF. Although charges may be accumulated in the parasitic capacitance 34 in this process, the charges accumulated during this period are discharged when the above-described switching control during the first period shown in FIG. 1A is again executed.

Next, during the fourth period shown in FIG. 1D, the switching element for light-emitting element 42 is controlled to be switched ON, and the switching elements for light-emitting element 12, 22, and 32, the common switching element 8, and the switching elements for discharging parasitic capacitance 18, 28, 38, and 48 are controlled to be switched OFF. Although charges may be accumulated in the parasitic capacitance 44 in this process, the charges accumulated during this period are discharged when the above-described switching control during the first period shown in FIG. 1A is again executed.

As described, when the switching elements for light-emitting element 22, 32, and 42 are sequentially switched, charges may be accumulated in the parasitic capacitances 24, 34, and 44. However, when the switching control during the first period shown in FIG. 1A is again executed, the charges in the parasitic capacitances 24, 34, and 44 are discharged. With such a configuration, it is possible to prevent light emission by the light-emitting elements 26, 36, and 46 due to charges in the parasitic capacitances 24, 34, and 44 when a control of a light emission pattern is executed to emit light from only the light-emitting element 16. Therefore, light can be more preferably emitted from only the light-emitting element 16.

In addition, according to the light-emitting element driving circuit 10, even if parasitic capacitances 15, 25, 35, and 45 (refer to FIG. 2A) are formed between the anode terminals and the cathode terminals of the light-emitting elements 16, 26, 36, and 46, the switching elements for discharging parasitic capacitance 18, 28, 38, and 48 are maintained in the OFF state in periods other than the first period which is a timing when light is emitted from the light-emitting element 16. With such a configuration, even if the parasitic capacitances 15, 25, 35, and 45 are formed, because there is no path for leakage currents to flow through the parasitic capacitances 15, 25, 35, and 45 during the second period, third period, and fourth period, light emission of the light-emitting elements 26, 36, and 46 can be prevented.

Next, a first alternative configuration of the light-emitting element driving circuit 10 will be described. A difference between the first alternative configuration of the light-emitting element driving circuit 10 and the above-described configuration of the light-emitting element driving circuit 10 lies only in the switching control of the controller 300, and, thus, the operation of the controller 300 will be primarily described.

During the first period (corresponding to FIG. 1A), the controller 300 controls the switching element for light-emitting element 12 and the common switching element 8 to be switched ON in order to emit light from the light-emitting element 16. In addition, the controller 300 controls the switching elements for light-emitting element 22, 32, and 42 to be switched OFF, in order to not emit light from the light-emitting elements 26, 36, and 46. The switching element for discharging parasitic capacitance 18 connected to the anode terminal of the light-emitting element 16 from which light is to be emitted is controlled to be switched OFF, and the other switching elements for discharging parasitic capacitance 28, 38, and 48 are controlled to be switched ON. With this configuration, the charges accumulated in the parasitic capacitances 24, 34, and 44 can be discharged.

During the second period (corresponding to FIG. 1B), the controller 300 controls the switching element for light-emitting element 22 to be switched ON and the switching elements for light-emitting element 12, 32, and 42 and the common switching element 8 to be switched OFF. The controller 300 also controls the switching element for discharging parasitic capacitance 28 corresponding to the switching element for light-emitting element 22 to be switched OFF and the other switching elements for discharging parasitic capacitance 18, 38, and 48 to be switched ON. With this configuration, the charges accumulated in the parasitic capacitances 14, 34, and 44 can be discharged.

During the third period (corresponding to FIG. 10), the controller 300 controls the switching element for light-emitting element 32 to be switched ON and the switching elements for light-emitting element 12, 22, and 42 and the common switching element 8 to be switched OFF. The controller 300 also controls the switching element for discharging parasitic capacitance 38 corresponding to the switching element for light-emitting element 32 to be switched OFF and the other switching elements for discharging parasitic capacitance 18, 28, and 48 to be switched ON. With this configuration, the charges accumulated in the parasitic capacitances 14, 24, and 44 can be discharged.

During the fourth period (corresponding to FIG. 1D), the controller 300 controls the switching element for light-emitting element 42 to be switched ON and the switching elements for light-emitting element 12, 22, and 32 and the common switching element 8 to be switched OFF. The controller 300 also controls the switching element for discharging parasitic capacitance 48 corresponding to the switching element for light-emitting element 42 to be switched OFF and the other switching elements for discharging parasitic capacitance 18, 28, and 38 to be switched ON. With this configuration, the charges accumulated in the parasitic capacitances 14, 24, and 34 can be discharged.

In this manner, according to a first alternative configuration of the light-emitting element driving circuit 10, the discharge process for the parasitic capacitances 14, 24, 34, and 44 is executed in all periods of the first period, the second period, the third period, and the fourth period. Therefore, it is possible to more preferably emit light from only the light-emitting element 16.

Next, a light-emitting element driving circuit 11 which is a second alternative configuration of the light-emitting element driving circuit 10 will be described. A difference between the light-emitting element driving circuit 11 and the first alternative configuration of the light-emitting element driving circuit 10 lies in resistor elements for discharging parasitic capacitance 19, 29, 39, and 49, and thus, this point will primarily be described.

The resistor elements for discharging parasitic capacitance 19, 29, 39, and 49 have first terminals connected to the anode terminals of the light-emitting elements 16, 26, 36, and 46, respectively, and second terminals connected to the first terminals of the switching elements for discharging parasitic capacitance 18, 28, 38, and 48. In addition, the resistor elements for discharging parasitic capacitance 19, 29, 39, and 49 have a function to inhibit a leakage current which flows when the parasitic capacitances 15, 25, 35, and 45 are formed between the anode terminals and the cathode terminals of the light-emitting elements 16, 26, 36, and 46, respectively.

Figure 2A:
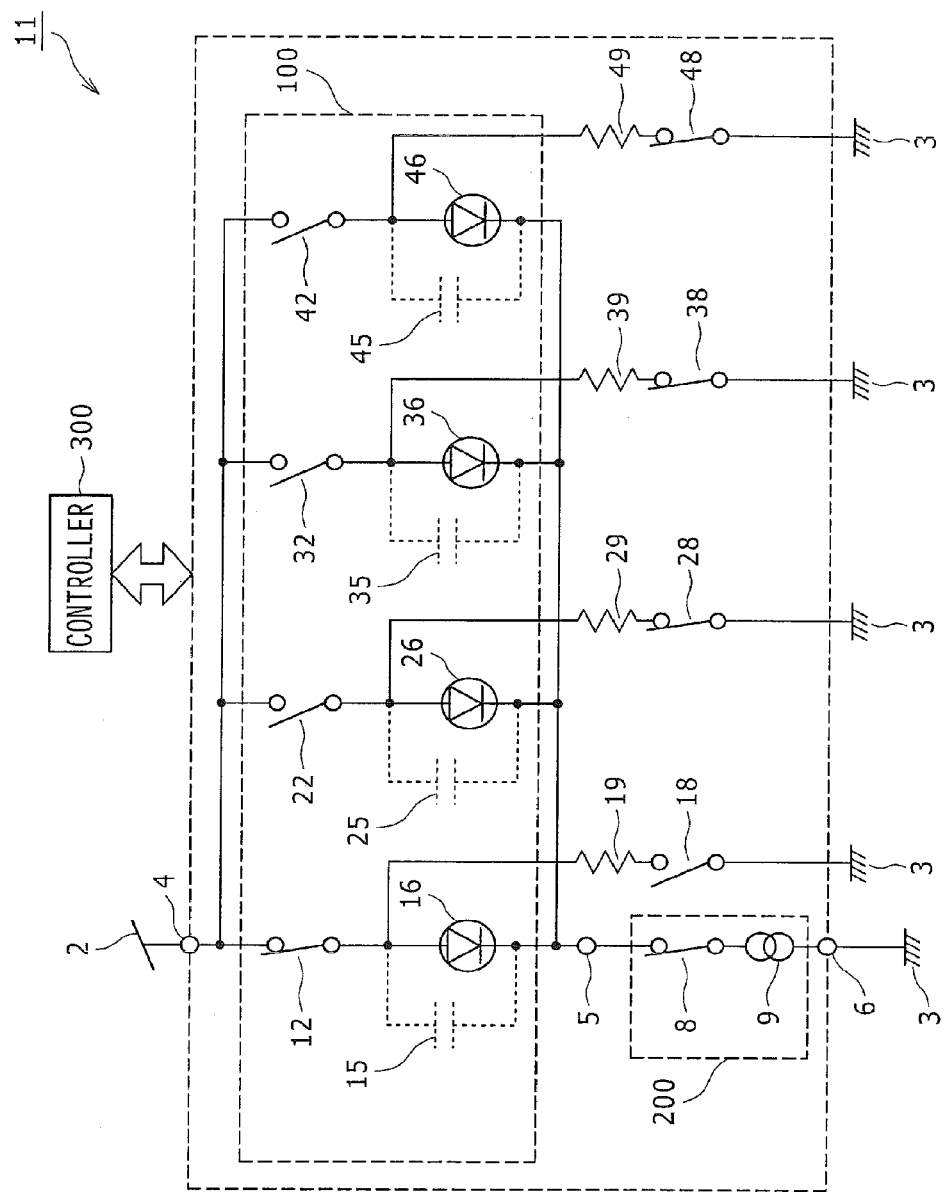
FIG. 2A is a diagram showing a switching control during a first period in a second alternative configuration of the preferred embodiment of the present invention.
Figure 2B:
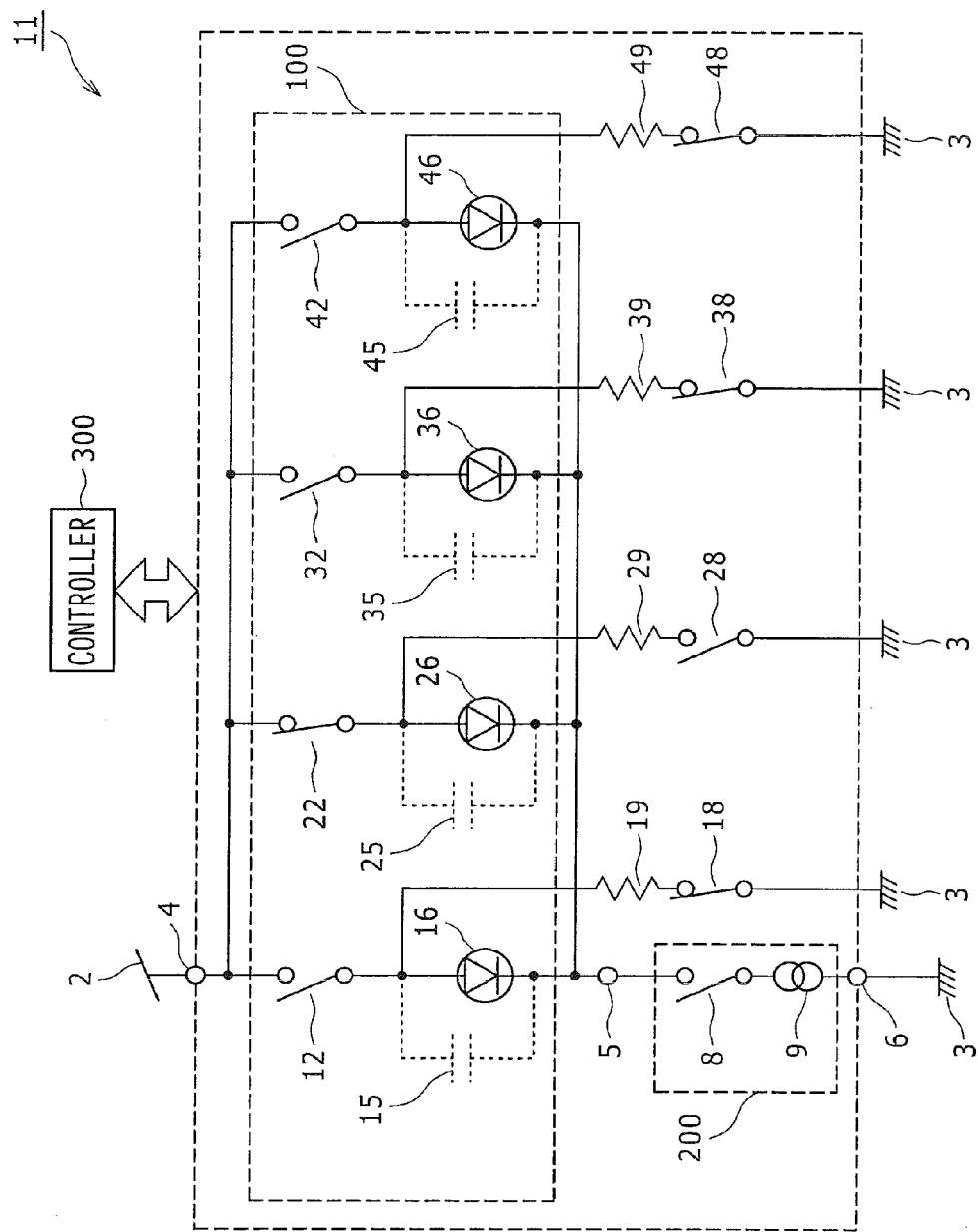
FIG. 2B is a diagram showing a switching control during a second period in the second alternative configuration of the preferred embodiment of the present invention.
Figure 2C:
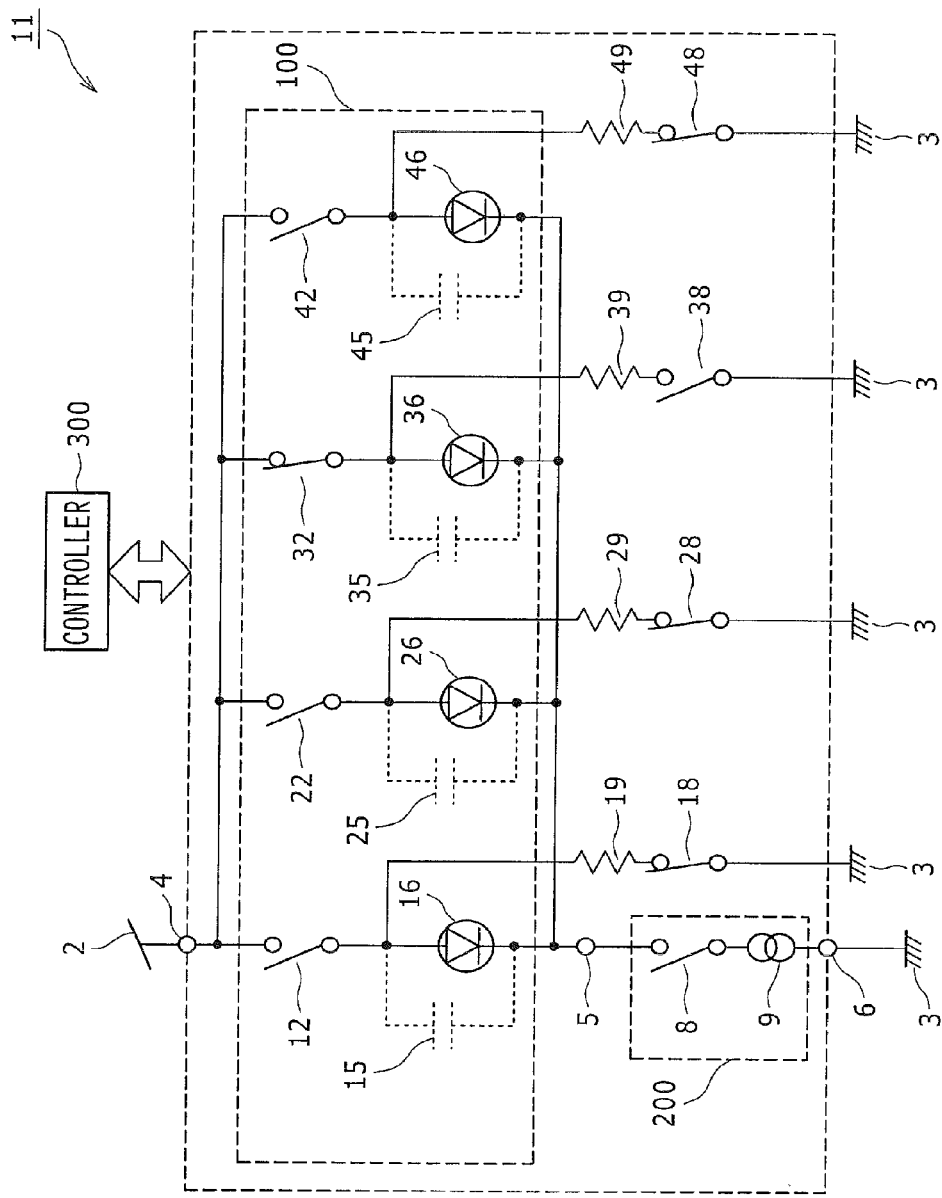
FIG. 2C is a diagram showing a switching control during a third period in the second alternative configuration of the preferred embodiment of the present invention.
Figure 2D:
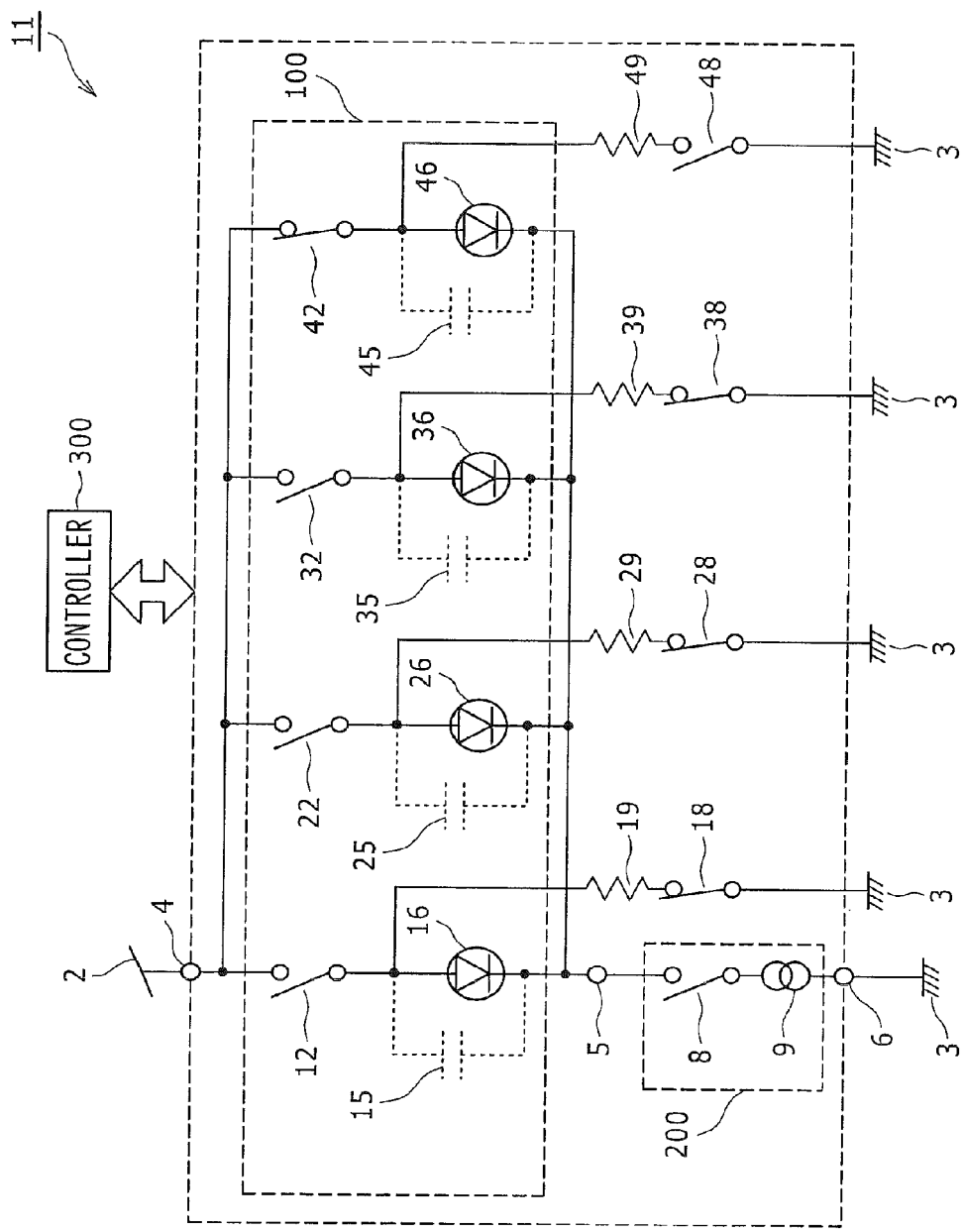
FIG. 2D is a diagram showing a switching control during a fourth period in the second alternative configuration of the preferred embodiment of the present invention.
Figure 3A:
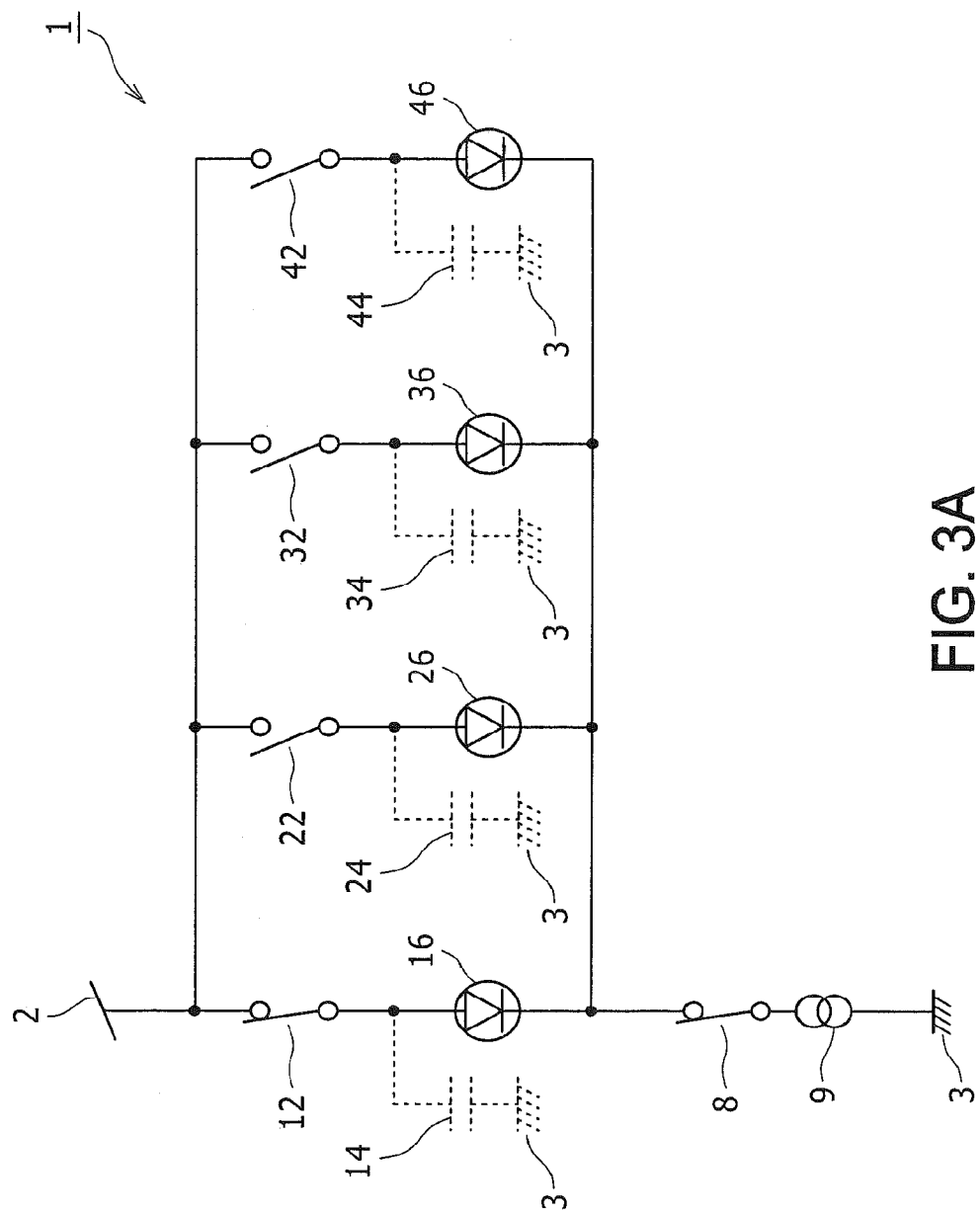
FIG. 3A is a diagram showing a switching control during a first period in the related art.
Figure 3B:
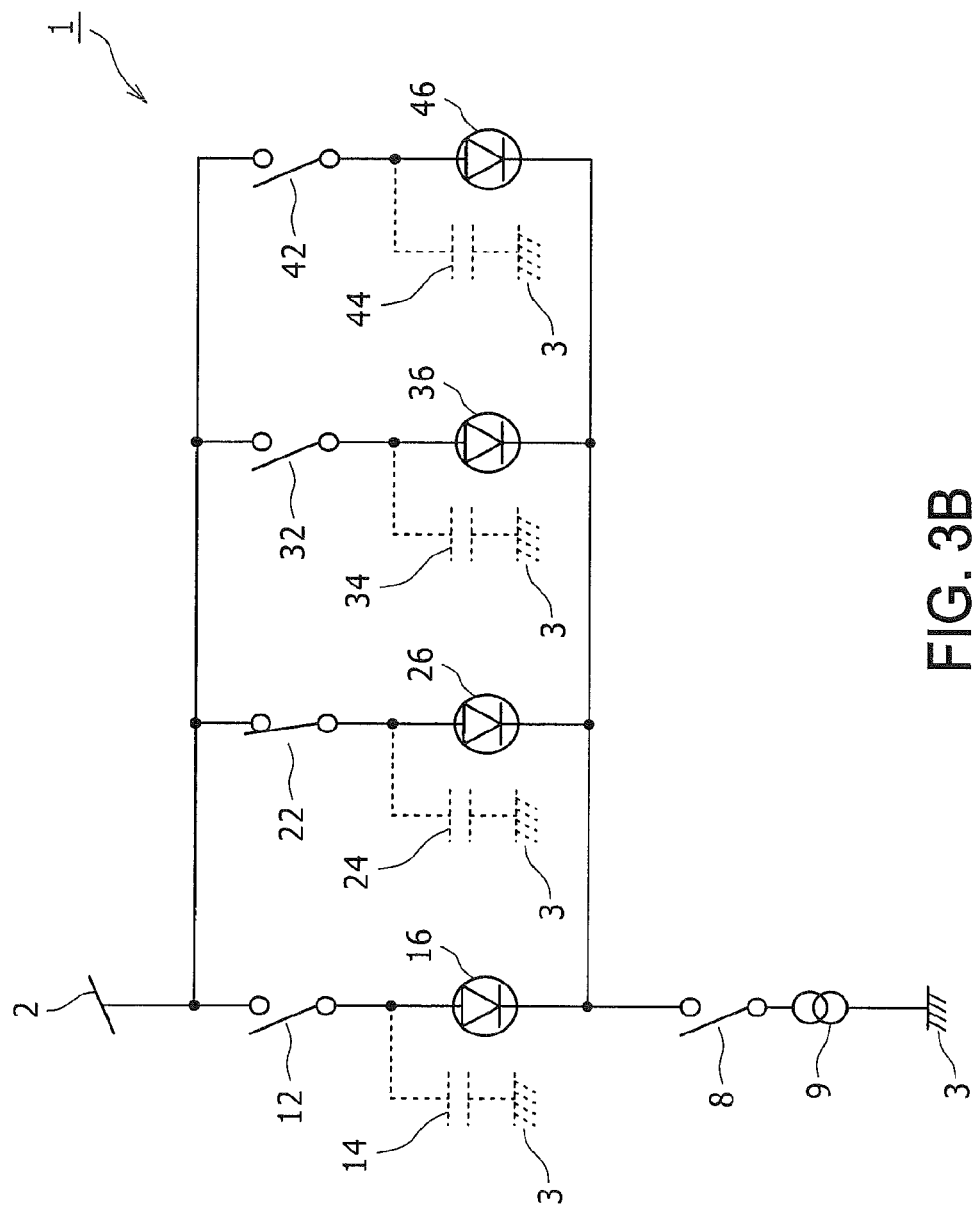
FIG. 3B is a diagram showing a switching control during a second period in the related art.
Figure 3C:
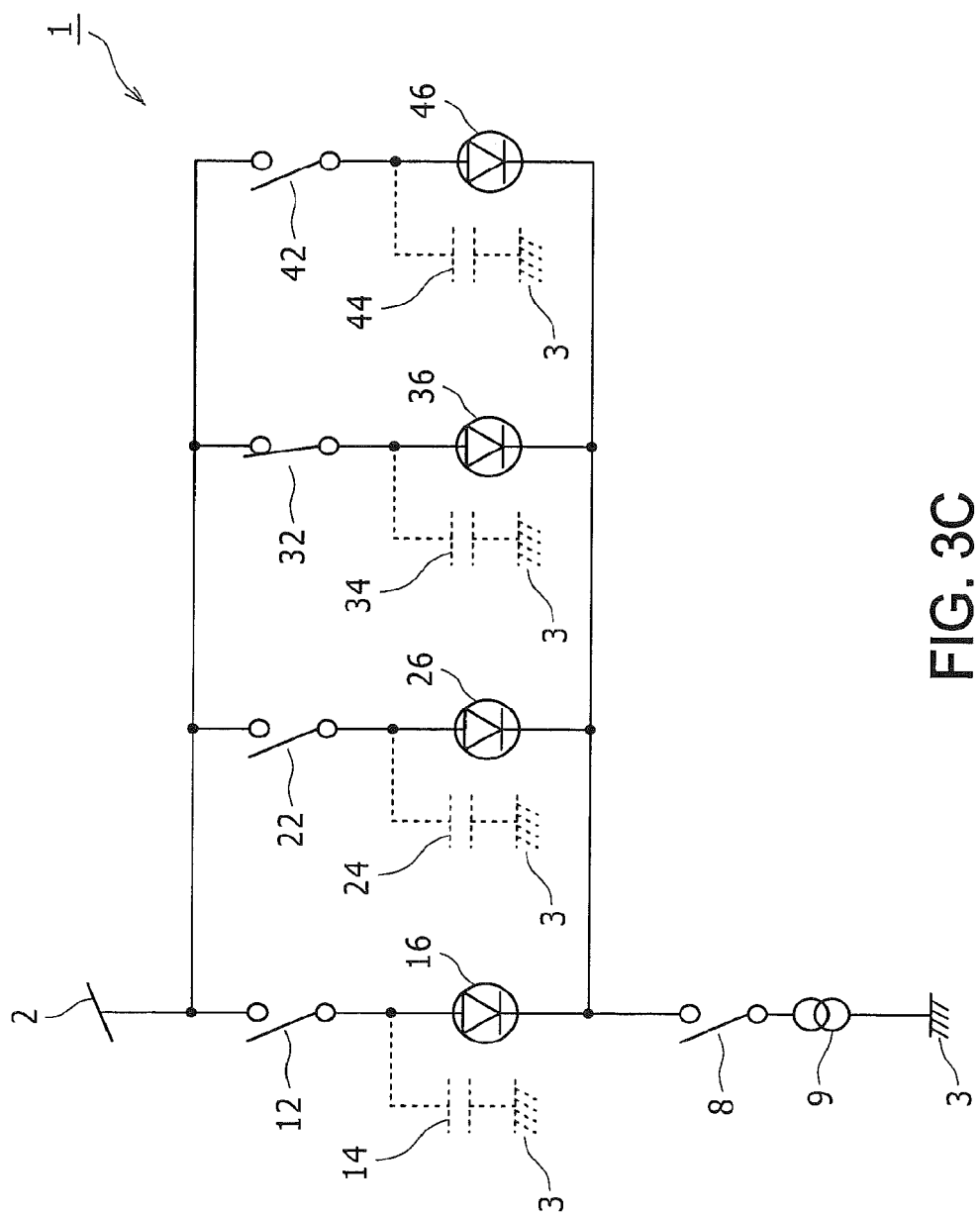
FIG. 3C is a diagram showing a switching control during a third period in the related art.
Figure 3D:
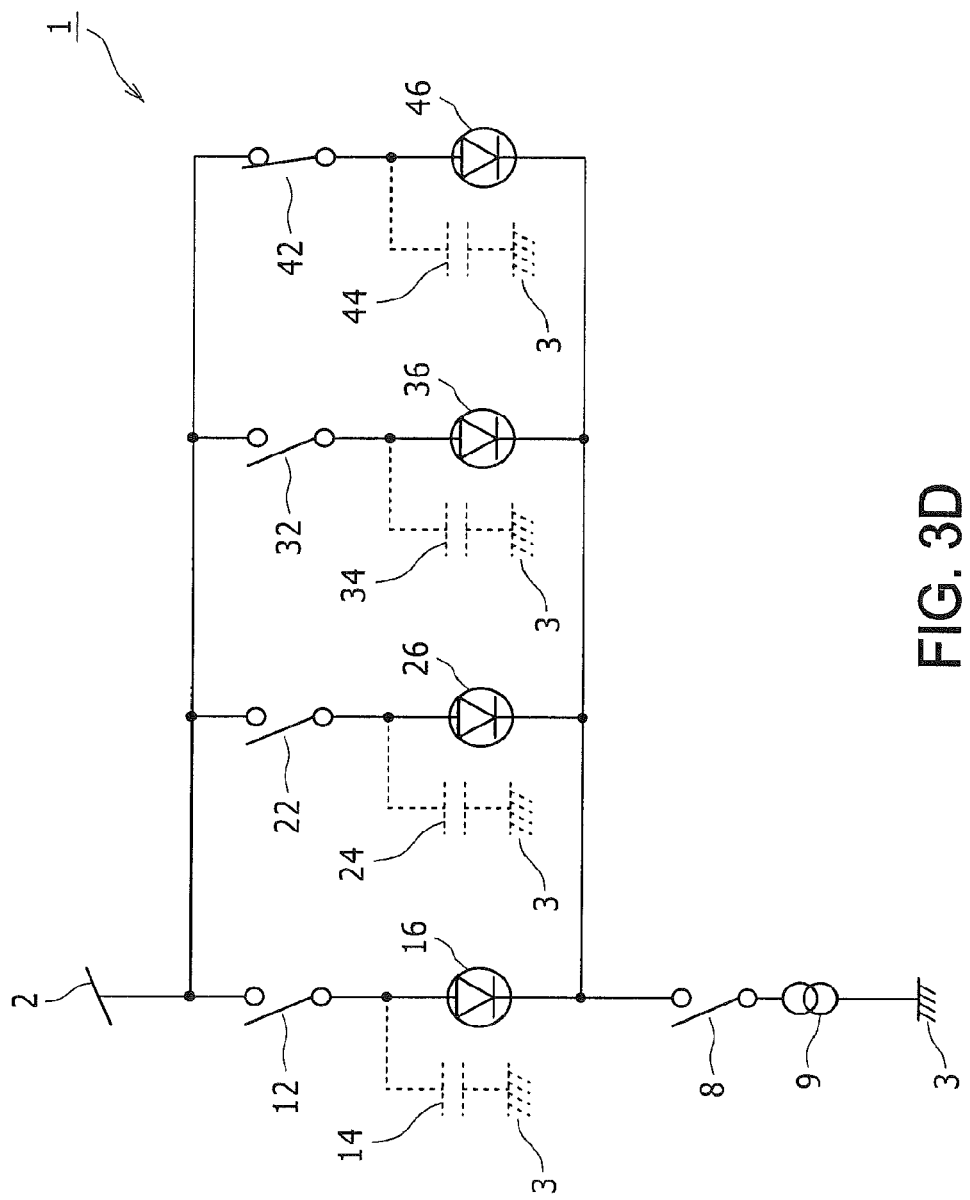
FIG. 3D is a diagram showing a switching control during a fourth period in the related art.

Next, an operation of the light-emitting element driving circuit 11 having the above-described structure will be described with reference to FIGS. 2A-2D. FIG. 2A is a diagram showing a switching control during a first period in a switching control of the controller 300. FIG. 2B is a diagram showing a switching control during a second period in the switching control of the controller 300. FIG. 2C is a diagram showing a switching control during a third period in the switching control of the controller 300. FIG. 2D is a diagram showing a switching control during a fourth period in the switching control of the controller 300. In FIGS. 2A-2D, in order to emit light at a certain timing from only the light-emitting element 16, the switching elements for light-emitting element 12, 22, 32, and 42, or the like are sequentially switched so that the switching control is applied by repeating, with a certain period, the states shown in FIG. 2A, FIG. 2B, FIG. 2C, FIG. 2D, FIG. 2A, FIG. 2B, . . . .

First, during the first period, in order to emit light from the light-emitting element 16, the switching control as shown in FIG. 2A is applied. Then, during the second period, the switching control as shown in FIG. 2B is applied. In this process, it is necessary to not emit light from the light-emitting element 26, and, thus, the switching element for light-emitting element 22 is controlled to be switched ON, and the switching elements for discharging parasitic capacitance 18, 38, and 48 are controlled to be switched ON. Because of this configuration, a leakage current may flow, by the current flowing in the light-emitting element 26, through the parasitic capacitances 15, 35, and 45 and switching elements for discharging parasitic capacitance 18, 38, and 48. However, because the light-emitting element driving circuit 11 has the resistor elements for discharging parasitic capacitance 19, 39, and 49, the leakage current may be inhibited.

Then, during the third period, the switching control as shown in FIG. 2C is executed. A leakage current flows, by the current flowing in the light-emitting element 36, through the parasitic capacitances 15, 25, and 45 and the switching elements for discharging parasitic capacitance 18, 28, and 48, but the leakage current can be inhibited by the resistor elements for discharging parasitic capacitance 19, 29, and 49.

In addition, during the fourth period, the switching control as shown in FIG. 2D is executed. A leakage current flows, by the current flowing in the light-emitting element 46, through the parasitic capacitances 15, 25, and 35 and the switching elements for discharging parasitic capacitance 18, 28, and 38, but the leakage current can be inhibited by the resistor elements for discharging parasitic capacitance 19, 29, and 39.

As described, with the light-emitting element driving circuit 11, when the switching elements for light-emitting element 12, 22, 32, and 42 are sequentially switched for emitting light from only the light-emitting element 16, even if the parasitic capacitances 15, 25, 35, and 45 are formed, the leakage current can be inhibited. Therefore, light can be more preferably emitted from the light-emitting element 16.

What is claimed is:

1. A light-emitting-element driving circuit comprising:
   a light-emitting circuit unit in which a plurality of current paths in each of which a light-emitting element and a first switching element are connected in series are placed in parallel with each other between a power supply terminal connected to an input power supply and a common terminal;
   a common circuit unit in which a second switching element and a constant current source which supplies a predetermined current which is defined in advance are connected in series, and which is placed between the common terminal and a ground terminal which is grounded; and
   a plurality of third switching elements each of which is placed between an anode terminal of the respective light-emitting element of the light-emitting circuit unit and ground, wherein
   a switching control is applied for the first switching elements, the second switching element, and the third switching elements.

2. The light-emitting element driving circuit according to claim 1, wherein
   during a period when the second switching element is controlled to be switched ON, third switching elements corresponding to first switching elements which are controlled to be switched OFF are simultaneously controlled to be switched ON, and
   during a period when the second switching element is controlled to be switched ON, third switching elements corresponding to first switching elements which are controlled to be switched ON are simultaneously controlled to be switched OFF.

3. The light-emitting element driving circuit according to claim 1, wherein
   third switching elements corresponding to first switching elements which are controlled to be switched OFF are simultaneously controlled to be switched ON, and
   third switching elements corresponding to first switching elements which are controlled to be switched ON are simultaneously controlled to be switched OFF.

4. The light-emitting-element driving circuit according to claim 3, further comprising:
   a resistor element connected in series to each of the third switching elements.

* * * * *